US011639168B2

(12) United States Patent
Brown et al.

(10) Patent No.: US 11,639,168 B2
(45) Date of Patent: May 2, 2023

(54) SYSTEMS AND METHODS FOR AUTOMATIC VEHICLE LOADING AND UNLOADING ON VEHICLE TRANSPORTS (71) Applicant: Toyota Motor North America, Inc., Plano, TX (US)

(72) Inventors: Tyler Brown, Dallas, TX (US); Valerie Impullitti, Proper, TX (US)

(73) Assignee: Toyota Motor North America, Inc., Plano, TX (US)

( * ) Notice: Subject to any disclaimer, the term of this patent is extended or adjusted under 35 U.S.C. 154(b) by 418 days.

(21) Appl. No.: 16/698,104

(22) Filed: Nov. 27, 2019

(65) Prior Publication Data
US 2021/0155230 A1 May 27, 2021

(51) Int. Cl.
  B60W 30/06 (2006.01)
  G05D 1/02 (2020.01)
  H04W 4/021 (2018.01)
  B61D 3/18 (2006.01)
  G06Q 10/083 (2023.01)

(52) U.S. Cl.
  CPC .............. B60W 30/06 (2013.01); B61D 3/18 (2013.01); G05D 1/0231 (2013.01); G05D 1/0276 (2013.01); G06Q 10/0838 (2013.01); H04W 4/021 (2013.01)

(58) Field of Classification Search
  CPC ... B60W 30/06; G05D 1/0231; G05D 1/0276; H04W 4/021; G06Q 10/0838
  USPC .......................................................... 701/24
  See application file for complete search history.

(56) References Cited

U.S. PATENT DOCUMENTS

| 10,049,573 | B1 | 8/2018 | Surnilia et al. |
| 10,146,226 | B1 | 12/2018 | Salter et al. |
| 10,245,993 | B1* | 4/2019 | Brady ................ B60H 1/00771 |
| 2014/0167961 | A1* | 6/2014 | Finlow-Bates ........ G08B 13/22 340/541 |
| 2014/0236686 | A1 | 8/2014 | Grush et al. |
| 2015/0063646 | A1* | 3/2015 | Wang .................. G06K 9/00812 382/104 |
| 2016/0171894 | A1* | 6/2016 | Harvey ................ G05D 1/0293 701/23 |
| 2018/0165967 | A1* | 6/2018 | Lee .......................... G08G 1/20 |
| 2019/0103024 | A1* | 4/2019 | Rosen .................... G08G 1/149 |
| 2020/0257317 | A1* | 8/2020 | Musk ................... G05D 1/0044 |
| 2021/0006332 | A1* | 1/2021 | Pandit .................... H04B 10/11 |
| 2021/0116581 | A1* | 4/2021 | Cooper .................. G01S 19/40 |

FOREIGN PATENT DOCUMENTS

| CN | 108120999 A | 6/2018 | |
| IN | 201721002976 A | 7/2018 | |
| JP | 2004272752 A | * 9/2004 | ......... B60H 1/00771 |
| KR | 20120000328 A | * 1/2012 | |
| KR | 20140028488 A | * 3/2014 | |
| WO | 2019/068559 A1 | 4/2019 | |

* cited by examiner

Primary Examiner — Isaac G Smith
(74) Attorney, Agent, or Firm — Dinsmore & Shohl LLP (57) ABSTRACT A method includes receiving geolocation data from a subject vehicle with respect to a transporter vehicle. The method further includes determining a subject vehicle has entered a geofence around a transporter vehicle based on the geolocation data. The method further includes determining a destination location within the transporter vehicle at which the subject vehicle is to park in response to determining the subject vehicle has entered the geofence around the transporter vehicle.

22 Claims, 11 Drawing Sheets

SYSTEMS AND METHODS FOR AUTOMATIC VEHICLE LOADING AND UNLOADING ON VEHICLE TRANSPORTS

TECHNICAL FIELD

The present application generally relates to the transport of vehicles and, more particularly, to increasingly automated ways to load and unload the vehicles on and from transports.

BACKGROUND

Groups of vehicles are often transported as inventory within various types of transporter vehicles, such as trucks, rail cars, and watercraft. Rather than having each vehicle individually travel under its own power to a common destination, it is more efficient and protective to the vehicles to transport them together within a single vessel. To facilitate this, vehicles are often manually driven to be loaded onto and unloaded from transporter vehicles, such as rail cars, for transport.

Accordingly, a need exists for more approaches to vehicle loading and unloading on vehicle transports.

SUMMARY

A method includes receiving geolocation data from a subject vehicle, determining a subject vehicle has entered a geofence around a transporter vehicle based on the geolocation data, and determining a destination location within the transporter vehicle at which the subject vehicle is to park in response to determining the subject vehicle has entered the geofence around the transporter vehicle.

In another embodiment, a system includes a memory and a processor coupled to the memory. The system includes a reporting module. Utilizing the processor, the reporting module is configured to receive geolocation data from a subject vehicle with respect to a transporter vehicle. The reporting module is further configured to determine a subject vehicle has entered a geofence around a transporter vehicle based on the geolocation data. The system also includes a coordination module configured to determine a destination location within the transporter vehicle at which the subject vehicle is to park in response to determining the subject vehicle has entered the geofence around the transporter vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to loading/unloading subject vehicles on and from a transporter vehicle. Specifically, the manner in which subject vehicles approach a transporter vehicle, enter a transporter vehicle, and/or park within a transporter vehicle may be implemented according to various embodiments. For example, in one embodiment, a subject vehicle may be driven by a driver onto a transporter vehicle such that a geofence can be used to keep track of the subject vehicle. In another embodiment, the subject vehicle may be autonomous such that it is in communication with the transporter vehicle. In still another embodiment, the transporter vehicle may summon an autonomous subject vehicle or direct it to depart.

Current approaches involve having vehicles individually driven onto a transport vehicle. This approach, however, wastes time in various ways. Tracking the inventory of vehicles as they enter/depart the transport vehicle is made more efficient by use of a geofence, in coordination with weight sensors and/or embedded cameras to more readily detect and report such changes. Embodiments described herein that utilize autonomous vehicles further increase efficiency by not requiring drivers and also allowing coordinated ingress/egress among the autonomous vehicles. Efficiency may also be improved in some embodiments where vehicles self-determine where to park within a transport vehicle, rather than having a person involved in making such determinations and directing vehicles accordingly.

Figure 1:
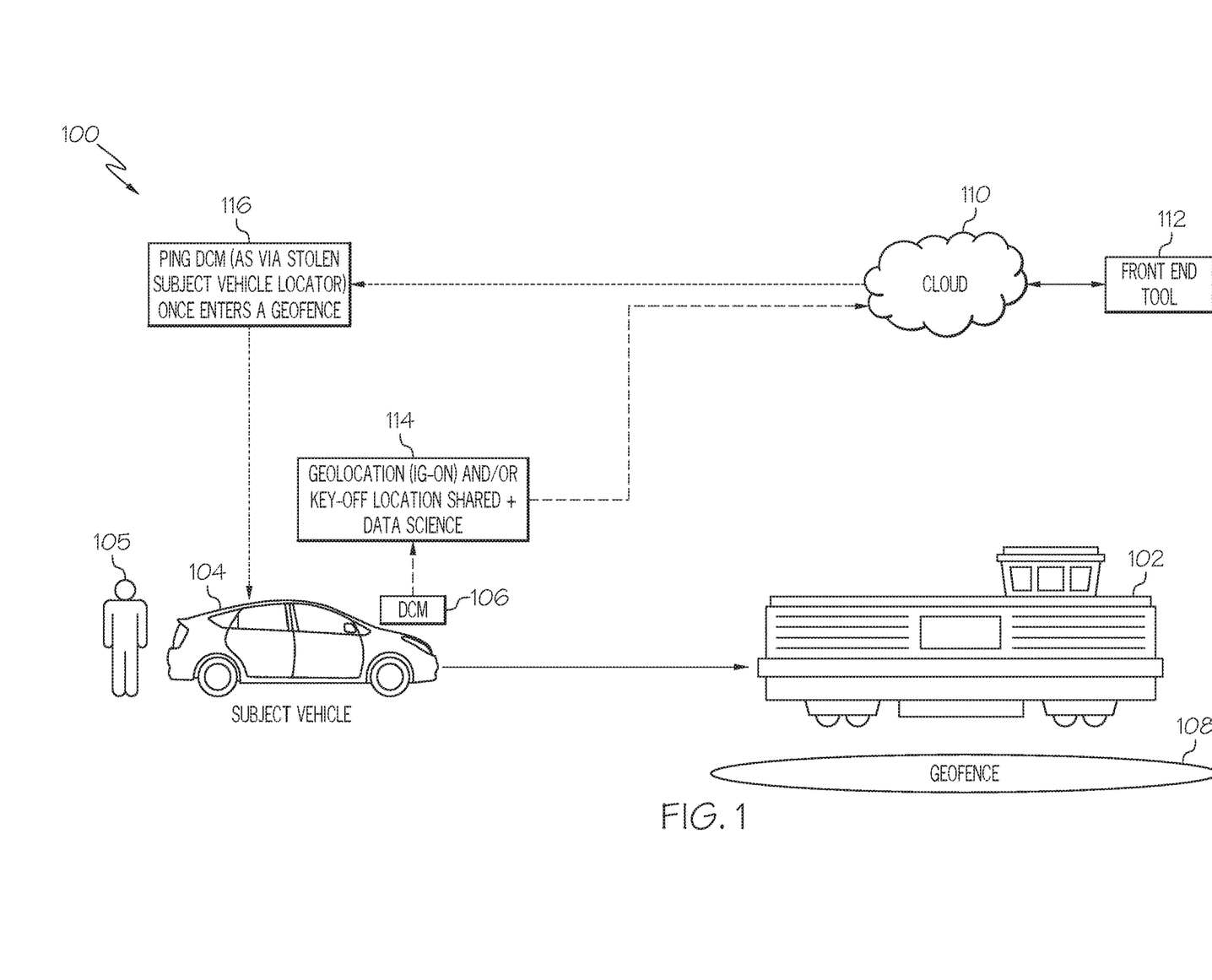
FIG. 1 is a diagram schematically illustrating an exemplary environment having a transporter vehicle utilizing driver-based loading/unloading of subject vehicles, according one or more embodiments shown and described herein.

Turning to FIG. 1, a transportation environment 100 is depicted in an embodiment featuring driver-based loading/unloading of subject vehicles 104 to/from a transporter vehicle 102. A transporter vehicle 102 may include any vehicle capable of transporting other vehicles. By way of non-limiting example, a transporter vehicle 102 may be a rail car or other type of train, a watercraft, a truck (e.g., car carrier trailer, flatbed, semi, and the like), aircraft, spacecraft, or anything else capable of transporting vehicles. A transporter vehicle 102 may be fully autonomous, semi-autonomous, or manually operated/navigated by a driver, pilot, captain, and the like. A subject vehicle 104 may include anything capable of transporting one or more passengers, including but not limited to cars, trucks, motorcycles, bicycles or any other type of passenger-powered vehicles, aircraft, spacecraft, watercraft, and submarines. A subject vehicle 104 may be operated/navigated by an operator 105, such as a driver, pilot, captain, etc. In other embodiments, the subject vehicle 104 may be partially autonomous, for example where the vehicle completes some tasks for the operator 105, such as parking or keeping the vehicle in its current lane. In still other embodiments, the subject vehicle 104 may be autonomous, for example where the vehicle operates with no input or minimal input (such as providing destination information or route preferences) from any occupant.

A subject vehicle 104 may include one or more data communication modules (DCM) 106. A DCM may be any computing device capable of sending/receiving data to/from the subject vehicle 104 to any other device, such as a server, satellite, cellular tower, another vehicle, the transporter vehicle 102, and the like. Any suitable communications protocol may be utilized, such as cellular (LTE, WiMAX, UMTS, CDMA, GSM, and the like), satellite, radio, and the like. A geofence 108 may be designated around the transporter vehicle 102 based upon location data associated with the transporter vehicle 102. For example, the transporter vehicle 102 may report its location to the subject vehicle 104 and/or other devices, such as a remote server.

The subject vehicle 104 may report and/or take action based upon entering the geofence 108 associated with the transporter vehicle 102. The DCM 106 may report subject vehicle 104 geolocation data to a cloud 110 service. Any suitable type of cloud 110 may be utilized. In other embodiments, any other suitable type of remote data storage and/or processing may be utilized (network access storage, storage access network, and the like). A front end tool 112, which may be any suitable type of interface, may be in communication with the cloud 110. The front end tool 112 may be, for example, a logistics system such as a front end tool that allows users to access data pertaining to the subject vehicle 104 and its location.

The operator 105 may drive the subject vehicle 104 into and/or out of the transporter vehicle 102. At block 114, geolocation data may be reported from the DCM 106 to the cloud 110. The geolocation data may include ignition-on location data and/or key-off location data. For example, the location of the subject vehicle 104, relative to the transporter vehicle 102 at ignition-on and key-off, may be used to determine whether the subject vehicle 104 has entered the transporter vehicle 102 (e.g., based upon an ignition-on location outside of the geofence 108 and a key-off location inside the geofence 108). Similarly, an ignition-on location inside of the geofence 108 and a key-off location outside of the geofence 108 may be used to determine that the subject vehicle 104 departed the transport vehicle 102. In some embodiments, key-off data may be used to determine where the vehicle has parked inside the transporter vehicle 102. The DCM 106 may also utilize a global positioning system (GPS) or any other suitable location reporting technology to report the location of the subject vehicle 104 at intervals, at predetermined times, randomly, continuously, or the like. In this embodiment, data science may be utilized to determine where the subject vehicle 104 should be parked/stored within the transporter vehicle 102. For example, the transporter vehicle 102 may have multiple levels for parking, and suggested (or required parking) options may be presented to the operator 105, or in some embodiments, directly to the subject vehicle 104. At block 116, the DCM 106 may be pinged or otherwise queried once the subject vehicle 104 enters the geofence 108 around the transporter vehicle 102. In some embodiments, the DCM 106 may be pinged utilizing a stolen vehicle locator to report the location of the subject vehicle 104.

Figure 2:
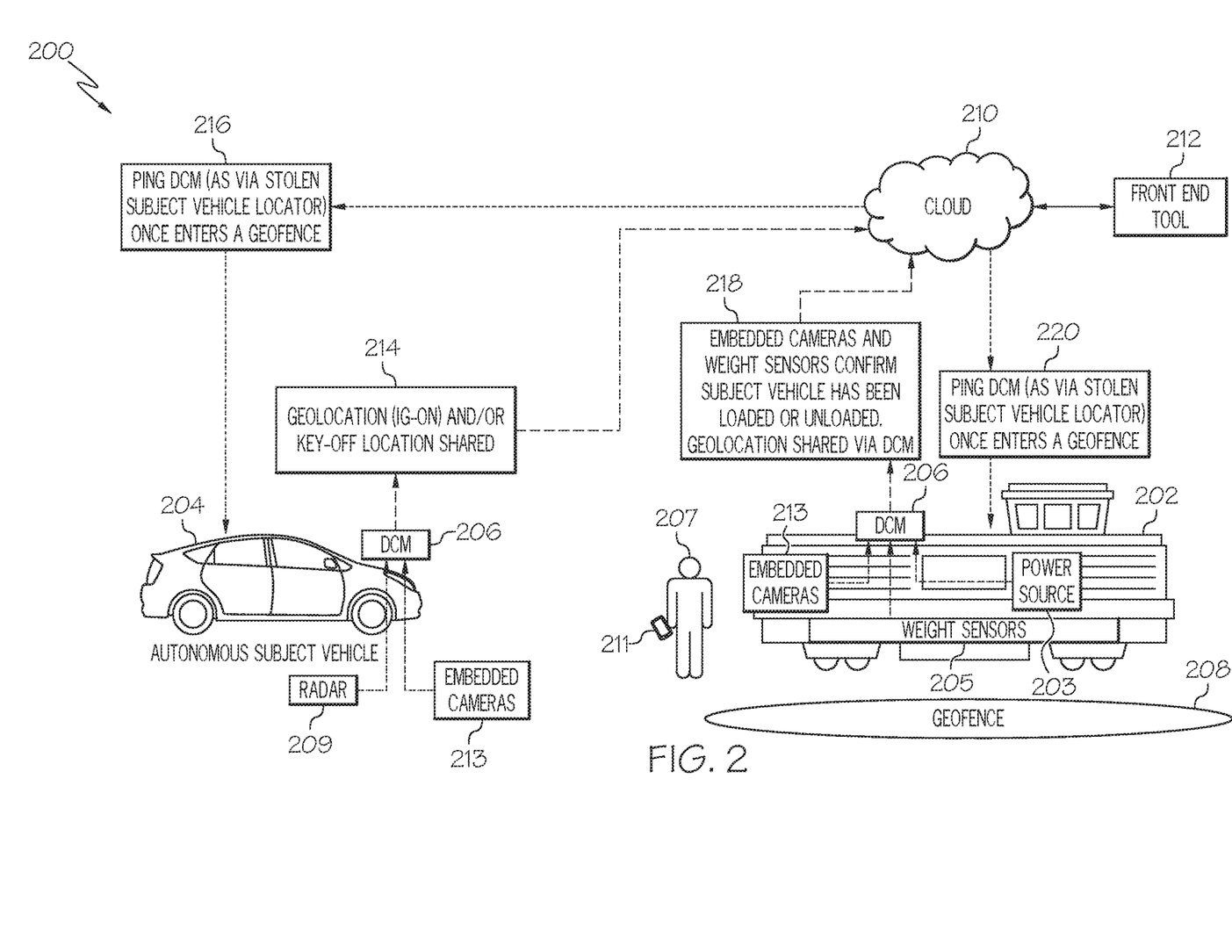
FIG. 2 is a diagram schematically illustrating an exemplary environment having a transporter vehicle that communicates with subject vehicles regarding loading/unloading, according one or more embodiments shown and described herein.

Turning to FIG. 2, another embodiment of a transportation environment 200 is depicted, in which a transporter vehicle 202 communicates with subject vehicles regarding their loading/unloading. In this embodiment, the subject vehicle is an autonomous subject vehicle 204. In addition to a DCM 206, the autonomous subject vehicle 204 may include one or more embedded cameras 213 and/or radar 209, which may be used to assist with navigation. In various embodiments, the embedded cameras 213 and/or radar 209 may be located, by way of non-limiting example, on the top, bottom, front, back, and/or any side of the autonomous subject vehicle 204. In embodiments, the embedded cameras may include any suitable type of imaging device (still, video, digital, analog, etc.) and utilize any suitable type of imaging (visible light, night-vision, infra-red, microwave, etc.). Embedded cameras 213 as part of the same autonomous subject vehicle 204 need not all be the same. In some embodiments, LIDAR, sonar, or other detection technologies may be utilized instead of, or in combination with, radar 209.

In embodiments, the transporter vehicle 202 may include a power source 203, weight sensors 205, a DCM 206, and/or embedded cameras 213. The power source 203 may be anything capable of generating power and/or mobility, such as an internal combustion engine, battery, nuclear power source, and the like. Weight sensors 205 may be utilized to determine when a vehicle has entered/exited one or more locations within the transporter vehicle 202, and/or to track movement of autonomous subject vehicles 204 within the transporter vehicle 202. Embedded cameras 213 may also be utilized with image recognition software to determine when an autonomous subject vehicle 204 has entered/exited one or more locations within the transporter vehicle 202. At block 218, the embedded cameras 213 and/or weight sensors 205 may send data to a cloud 210 service and a front end tool 212, wherein the data may be matched based on timestamps for vehicle verification purposes. In some embodiments, subject vehicle identification number data and subject vehicle location and corresponding timestamp data may be sent to a cloud location.

In this embodiment, the transporter vehicle 202 may be manually operated, partially autonomous, or fully autonomous (e.g., a smart vehicle). However, even if fully autonomous, a coordinator 207 (e.g., a person associated with the transporter vehicle 202), utilizing a mobile device 211 (such as a tablet or any other suitable computing device) may oversee the inventory of autonomous subject vehicles 204, verify that operations and inventory are correct, and take corrective action if needed. For example, the coordinator may utilize a mobile device with a webapp that can access the transporter vehicle 202 manifest and vehicle identification numbers (VINs) of subject vehicles associated with various vehicle manufacturing plants and/or ports of entry. This may occur such that each of a plurality of subject vehicles to be loaded onto or unloaded off of a transporter vehicle is assigned to a particular location on the vehicle transport as part of a vehicle manifest.

The coordinator 207 may summon autonomous subject vehicles 204 to the transporter vehicle 202 and/or direct them to exit the transporter vehicle 202. In this embodiment, data science may be utilized to determine on which level and/or in which spot an autonomous subject vehicle 204 should park within the transporter vehicle 202. In other embodiments, the coordinator 207 may designate for an autonomous subject vehicle 204, through the mobile device 211, a level and/or spot for the subject vehicle and/or manually send instructions for the autonomous subject vehicle 204 to exit the transporter vehicle 202. In some embodiments, the level and/or spot within the transporter vehicle 202 may be determined by the data science such that the coordinator 207, through the mobile device 211, need only provide entry and/or exit commands to autonomous subject vehicles 204.

At block 214, geolocation data may reported from the DCM 206 to the cloud 210. The geolocation data may include ignition-on location data and/or key-off location data. The DCM 206 may also utilize GPS or other suitable location reporting technology to report the location of the autonomous subject vehicle 204 at intervals, at predetermined times, randomly, continuously, or the like. At block 216, the DCM 206 may be pinged or otherwise queried once the autonomous subject vehicle 204 enters/exits the geofence 208 around the transporter vehicle 202. In this embodiment, the DCM 206 may be pinged by utilizing a stolen vehicle locator to report the location of the autonomous subject vehicle 204. At block 218, the embedded cameras 213 and weight sensors 205 can be used to confirm that an autonomous subject vehicle 204 has been loaded/unloaded. The DCM 206 of the transporter vehicle 202 may also provide its geolocation data to the cloud 210. Data in the cloud 210 may be sent to and received from the front end tool 212, which may be any suitable type of interface for observing and/or managing any of the elements described herein. At block 220, the DCM 206 of the transporter vehicle 202 may be pinged from the cloud 210 utilizing a stolen vehicle locator once the transporter vehicle 202 enters a geofence 208, which may correspond to a predefined destination.

Figure 3:
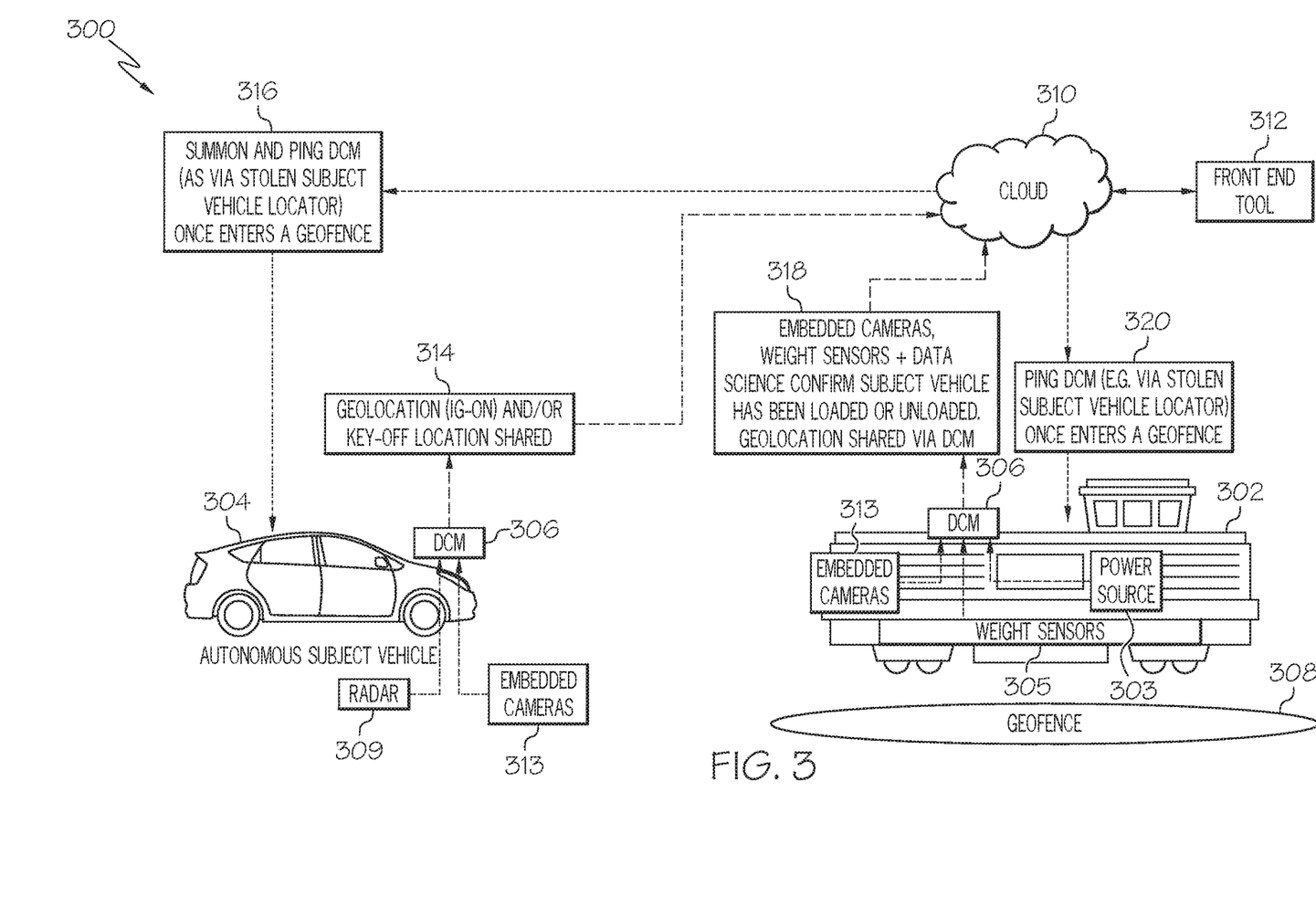
FIG. 3 is a diagram schematically illustrating an exemplary environment having a transporter vehicle that summons and/or manages subject vehicles, according one or more embodiments shown and described herein.

Turning to FIG. 3, a further embodiment of a transportation environment 300 is depicted, in which a smart transporter vehicle 302 summons autonomous subject vehicles 304 to load/unload themselves with respect to the smart transporter vehicle 302. More specifically, the smart transporter vehicle 302 may communicate with a subject vehicle 304 regarding loading and/or unloading. As discussed further herein, summoning may be based upon a vehicle manifest that is stored in the cloud 310 (such as on a remote server), in the smart transporter vehicle 302, or any other suitable location.

In this embodiment, the smart transporter vehicle 302 is also an autonomous vehicle, and may include a DCM 306, embedded cameras 313, and radar 309. At block 314, geolocation data may be reported from the DCM 306 to the cloud 310. The geolocation data may include ignition-on location data and/or key-off location data. The DCM 306 may also utilize GPS or other suitable location reporting technology to report the location of the autonomous subject vehicle 304 at intervals, at predetermined times, randomly, continuously, or the like. The smart transporter vehicle 302 may itself summon autonomous subject vehicles 304 to enter/leave based upon a vehicle manifest. In some embodiments, one or more vehicle manifests may be used (by the transporter vehicle or other device/vehicle) to summon and manage subject vehicles, including autonomous subject vehicles 304. The smart transporter vehicle 302 may include a power source 303, weight sensors 305, a DCM 306, and/or embedded cameras 313. At block 318, the embedded cameras 313 and/or weight sensors 305 may send data to a cloud 310 service, along with data science determinations that identify which autonomous subject vehicles 304 that have been loaded/unloaded from the smart transporter vehicle 302. In some embodiments, the front end tool 312 may be utilized to match autonomous subject vehicles 304 based on timestamps for verification purposes. In some embodiments, a subject vehicle (manual or autonomous) may be verified utilizing the embedded cameras 313 or weight sensors 305 providing data that is matched with the timestamp data. In other embodiments, the autonomous subject vehicles 304 may coordinate movement among one another to automatically load into the smart transporter vehicle 302 in a specific order to utilize the assigned locations.

At block 316, the smart transporter vehicle 302 may summon one or more autonomous subject vehicles 304 to enter and/or exit the smart transporter vehicle 302. Additionally, the DCM 306 may be pinged or otherwise queried once the autonomous subject vehicle 304 enters/exits the geofence 308 around the smart transporter vehicle 302. In this embodiment, the DCM 306 may be pinged by utilizing a stolen vehicle locator to report the location of the autonomous subject vehicle 304. The autonomous subject vehicles 304 may also self-report their location to the smart transporter vehicle 302. The DCM 306 of the smart transporter vehicle 302 may provide its geolocation data to the cloud 310. Data in the cloud 310 may be sent to and received from the front end tool 312, which may be any suitable type of interface for observing and/or managing any of the elements described herein. At block 320, the DCM 306 of the smart transporter vehicle 302 may be pinged from the cloud 310, such as utilizing a stolen vehicle locator once the smart transporter vehicle 302 enters the geofence 308, which may correspond to a predefined destination.

Figure 4:
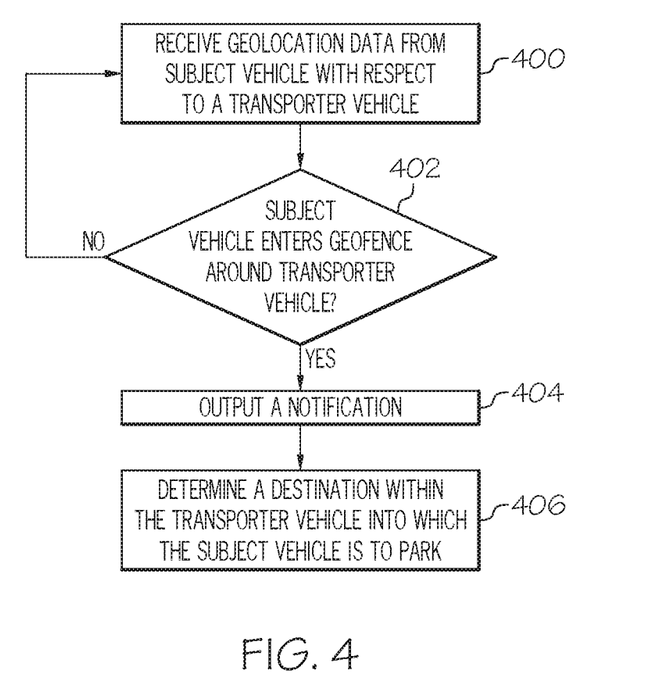
FIG. 4 illustrates a flowchart for loading/unloading of subject vehicles with respect transporter vehicle, according to one or more embodiments described and illustrated herein.
Figure 5:
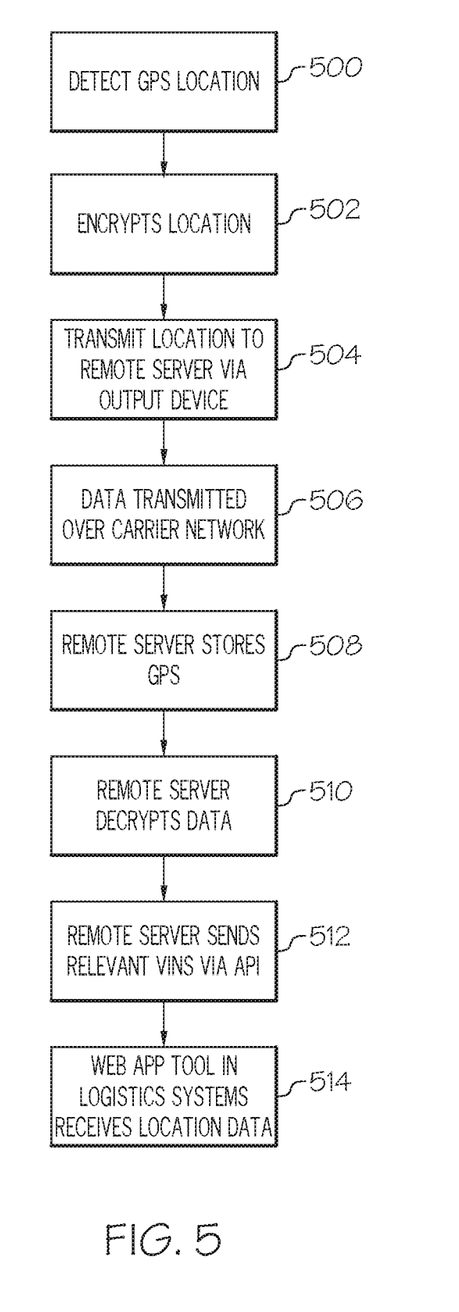
FIG. 5 illustrates a flowchart for server-based loading/unloading of subject vehicles with respect to a transporter vehicle, according to one or more embodiments described and illustrated herein.

The subject vehicle embodiments disclosed and discussed with respect to FIGS. 1-3 may correspond to the subject vehicle disclosed and discussed with respect to FIGS. 4-5. Other items from FIGS. 1-3 that may correspond with respect to FIGS. 4-5 may include a transport vehicle, a geofence, a cloud network, weight sensors, radar, a mobile device, and the like.

Turning to FIG. 4, a flowchart for loading/unloading of subject vehicles with respect to a transporter vehicle is depicted. At step 400, geolocation data from a subject vehicle is received with respect to a transporter vehicle. For example, the DCM of the subject vehicle may transmit its current location data to the cloud or directly to the transporter vehicle. At step 402, a determination is made as to whether the subject vehicle has entered a geofence around the transporter vehicle. If the subject vehicle has not entered the geofence (NO at step 402), then the flowchart returns to step 400. If the subject vehicle enters the geofence (YES at step 402), then at step 404, a notification is output to reflect this. The notification may be transmitted to the transporter vehicle, to the cloud or remote server, and/or generated as an in-vehicle notification in the subject vehicle, particularly when there is an occupant present. In some embodiments, the notification may include an audio/visual/haptic alert to a person (driver/occupant of the subject vehicle, coordinator associated with the transport vehicle, user of the front end tool, and the like). In some embodiments, the notification may be logged within a system (on-board equipment in the subject vehicle and/or transporter vehicle, cloud, remote server/database, and the like). At step 406, a destination location for the subject vehicle to park within the transporter vehicle is determined. Any suitable data science algorithm may be utilized to determine locations to park subject vehicles within the transporter vehicle. The determined parking pot may be provided to a driver/occupant of the subject vehicle, to an autonomous subject vehicle, or both ie., where autonomous subject vehicles and manually-driven subject vehicles are both being operated with respect to the same transporter vehicle).

Turning to FIG. 5, a flowchart for server-based loading/unloading of subject vehicles with respect to a transporter vehicle is depicted. At step 500, the DCM of a subject vehicle detects its current GPS location. In other embodiments, any suitable type of device may be utilized to obtain the current location of the subject vehicle, such as geographic information systems (GIS), radio frequency identification (RFID), Wireless Local Area Network (WLAN), and the like. At step 502, the location data is encrypted at the DCM. In other embodiments, the data may be encrypted by another device or not at all. At step 504, the encrypted location of the subject vehicle may be output by the DCM or any other suitable output device. At step 506, the location data may be transmitted over a carrier network (e.g., 3G, 4G, LTE, 5G, and the like) or any other suitable type of network. At step 508, the GPS location data may be transmitted to and stored at a remote server or any other suitable type of device, which may include a database in some embodiments. At step 510, the remote server decrypts the encrypted GPS location data. At step 512, the remote server sends data containing relevant vehicle VIN, for example, via an Application Programming Interface (API). In this embodiment, the transporter vehicle may utilize a vehicle manifest of VIN, such that when a subject vehicle enters (or exits) the transporter vehicle's geofence, the VIN of the subject vehicle is added (or removed) from the manifest based upon the remote server providing the updated VIN data. At step 514, a web app tool in a logistics system (such as TLS) may receive the subject vehicle's location. For example, the web app tool may be or include the front end tool that allows TLS users to access data pertaining to the subject vehicle and its location. The update in the subject vehicle's location may then be reflected in the web app tool. In some embodiments, the subject vehicle is an autonomous vehicle that personnel summon, via a web app, onto the transporter vehicle to auto-park/auto-depart the transporter vehicle. The web app tool may provide vehicle information such as the vehicle manifest and/or vehicle identification numbers.

Figure 6:
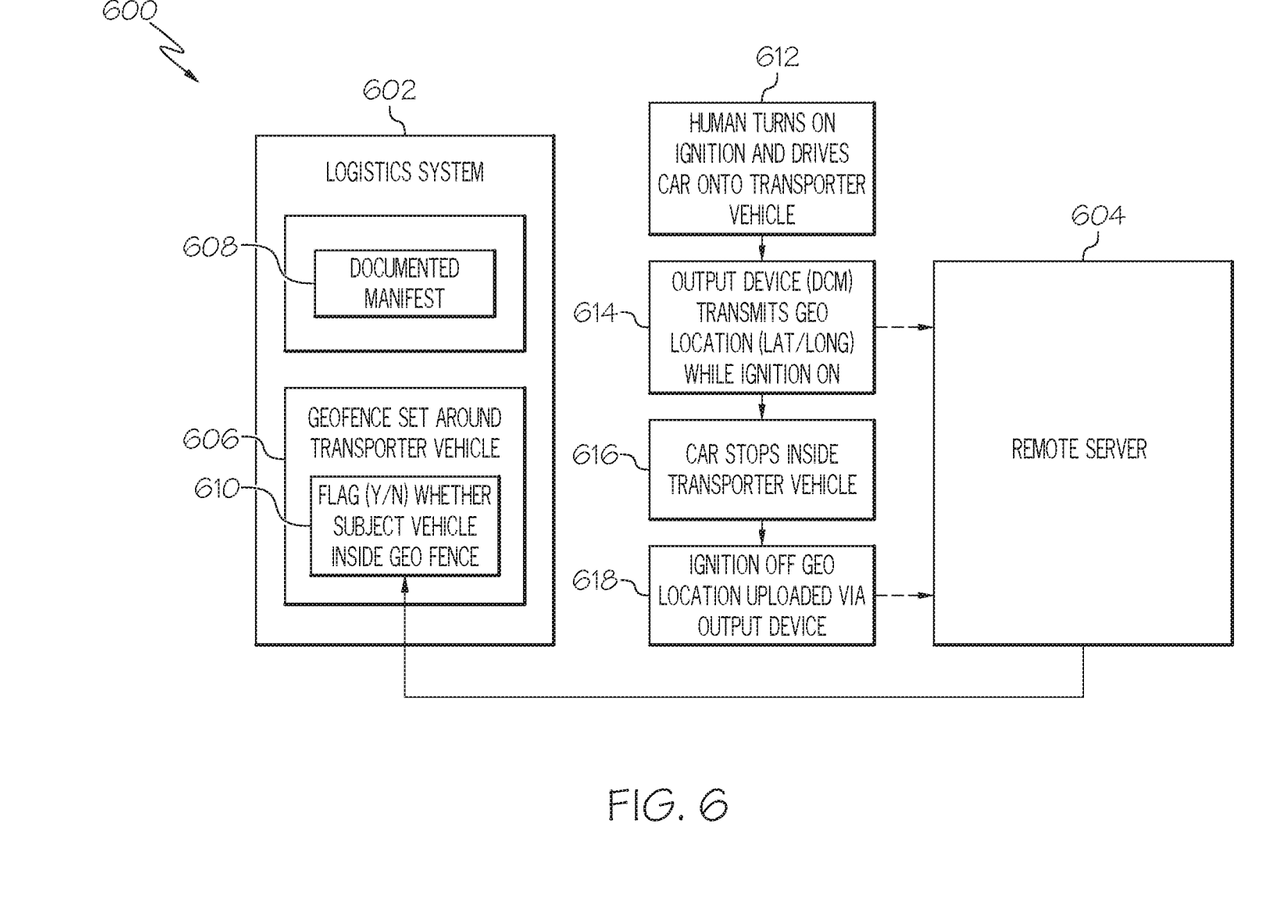
FIG. 6 is a block diagram illustrating an exemplary system for human-based loading/unloading of subject vehicles with respect to a transporter vehicle, according one or more embodiments shown and described herein.

Turning to FIG. 6, a system 600 for human-based loading/unloading of subject vehicles with respect to a transporter vehicle is depicted. Returning to the embodiment depicted in FIG. 1, a subject vehicle may be on and provide real-time location data (e.g., via GPS) and ignition-off location data. At block 612, a person (such as a driver) may turn on the ignition of the subject vehicle (a car in this example) and drive the subject vehicle onto a transporter vehicle. At step 614, an output device (the DMC in this example) may transmit the geographic location (GPS or the like) with latitude/longitude coordinates to the remote server 604 while the ignition of the subject vehicle is on. For example, the subject vehicle's DCM may provide real-time CAN300 location data while the ignition is on. At step 616, the subject vehicle may stop once inside the transporter vehicle. In some embodiments, the subject vehicle may have exited the transporter vehicle and then come to a stop.

At step 618, based upon the ignition being turned off (or the vehicle otherwise being turned off), the geo location information (such as the GPS coordinates) may be uploaded from the subject vehicle (such as via its DCM) to the remote server 604. The remote server 604 may then provide various data to the logistics system 602, such as geo location data, ignition on/off timestamps, and the like. Specifically, the logistics system 602 may monitor/manage the transporter vehicle geofence 606. The logistics system 602 may also track, such as by a yes/no flag 610 or any other suitable type of record/indicator, whether the subject vehicle is inside the geofence of the transporter vehicle, or outside of the geofence (in the case of departing subject vehicles). The logistics system 602 may include a documented manifest 608 of the arrivals/departures of subject vehicles to/from a transporter vehicle. In this way, the inventory of subject vehicles at any given time may be determined, along with changes in the transporter vehicle's inventory of subject vehicles over time.

Figure 7:
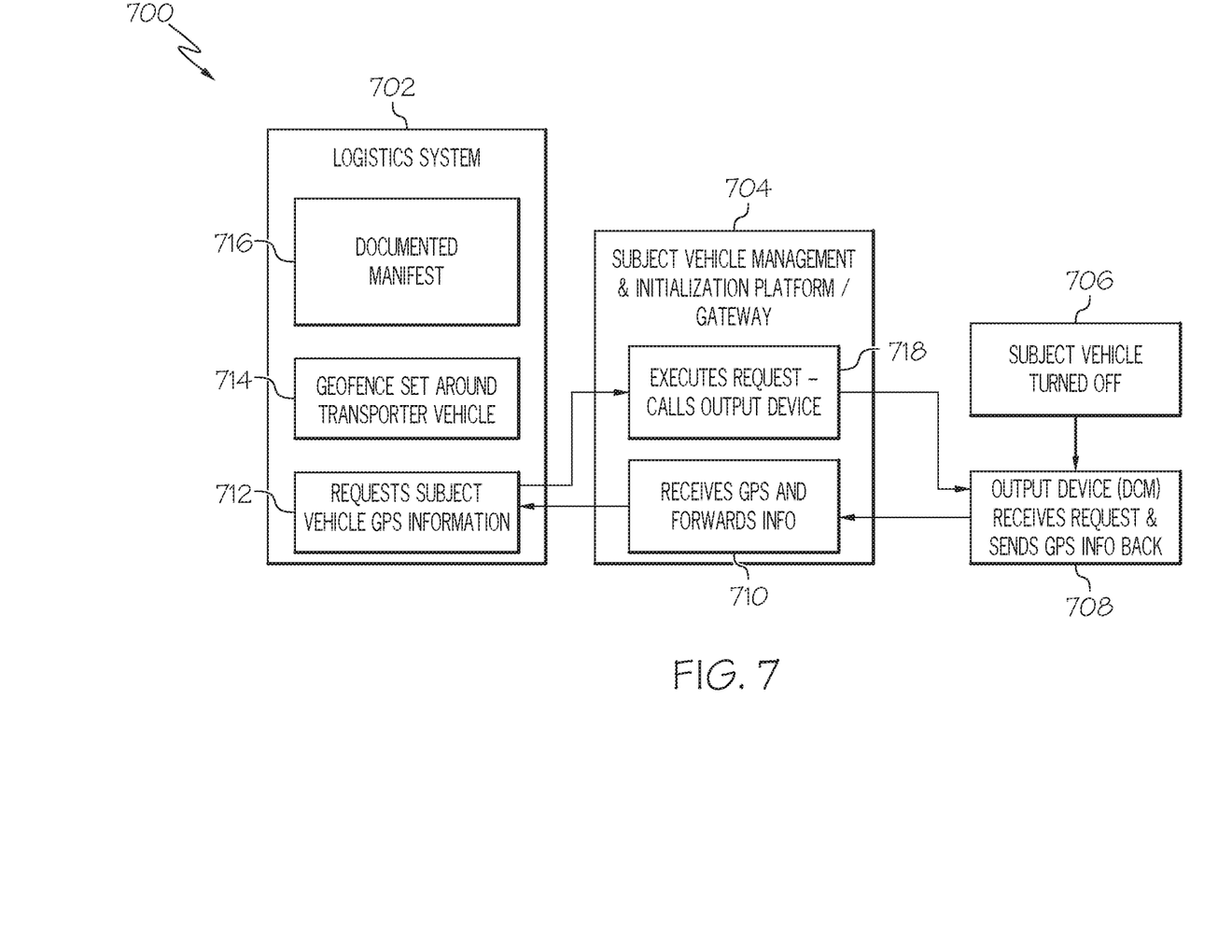
FIG. 7 is a block diagram illustrating an alternative system for human-based loading/unloading of subject vehicles with respect to a transporter vehicle, according one or more embodiments shown and described herein.

Turning to FIG. 7, an alternative system 700 for human-based loading/unloading of subject vehicles with respect to a transporter vehicle is depicted. In this embodiment, which may also correspond to FIG. 1, a subject vehicle may be off such that its stolen vehicle locator (such as its DCM) may be pinged to determine its location data (such as GPS). The logistics system 702 may include a documented manifest 716 of the arrivals/departures of subject vehicles to/from a transporter vehicle. In this way, the inventory of subject vehicles at any given time may be determined, along with changes in the transporter vehicle's inventory of subject vehicles over time. The logistics system may also utilize data pertaining to a geofence set around the transporter vehicle 714.

At block 712, the logistics system 702 may request GPS information pertaining to a subject vehicle. At block 718, the request for subject vehicle GPS information may be executed by a subject vehicle management and initialization platform 704 to call an output device such as the subject vehicle's DCM. At block 706, a subject vehicle is turned off. At block 708, the subject vehicle's output device (such as a DCM) may receive the request from block 718 (or react to the subject vehicle being turned off at block 706) and return subject vehicle location data (GPS and the like). At block 710, the subject vehicle management and initialization platform 704 may receive location data (GPS and the like) and forward it on to the logistics system 702, thus returning to block 712.

Figure 8:
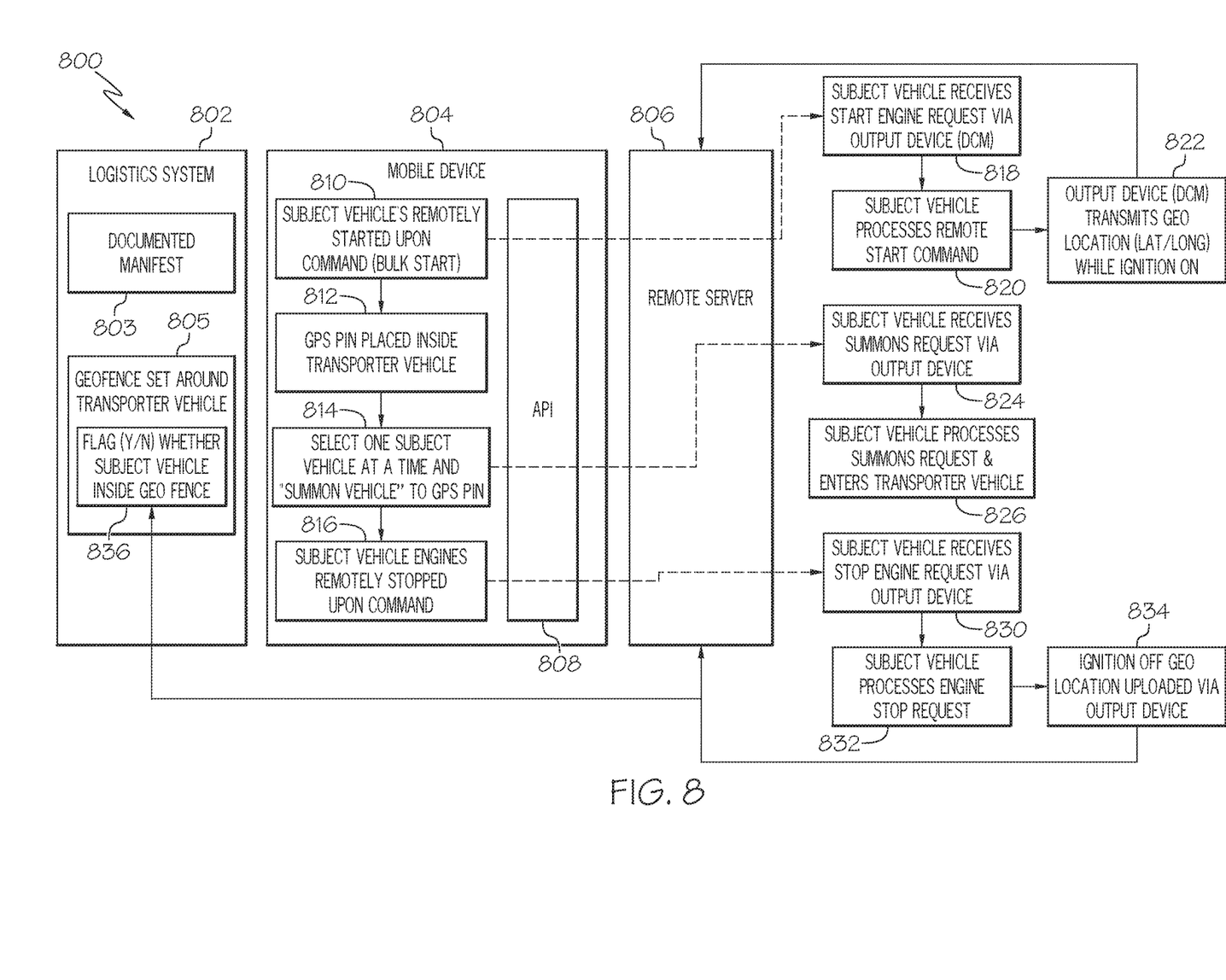
FIG. 8 is a block diagram illustrating an exemplary system for automated loading/unloading of subject vehicles with respect to a transporter vehicle utilizing a mobile device and remote server, according one or more embodiments shown and described herein.

Turning to FIG. 8, a system for automated loading/unloading of subject vehicles with respect to a transporter vehicle utilizing a mobile device and remote server is depicted. In this embodiment, which may correspond to FIG. 2, an autonomous subject vehicle may be triggered by a human coordinator for loading/unloading into/from a transporter vehicle. The logistics system 802 may include a documented manifest 803 of the arrivals/departures of subject vehicles to/from a transporter vehicle. In this way, the inventory of subject vehicles at any given time may be determined, along with changes in the transporter vehicle's inventory of subject vehicles over time. The logistics system 802 may also set and/or monitor a geofence around a transporter vehicle 805.

A mobile device 804, which may be utilized by the human coordinator aboard the transporter vehicle or at any other suitable location, may remotely start subject vehicles upon command (such as with a bulk command or an individualized start command). In some embodiments, a shutdown/ignition-off command may be issued to subject vehicles in bulk or individually. The mobile device 804 may also feature an API 808 to communicate commands to a remote server 806 and/or any other suitable device. In response to the remote start command at 810, the remote server 806 may provide a start-engine request to one or more autonomous subject vehicle DCMs at block 818. At block 820, an autonomous subject vehicle may process the remote start command. At block 822, the output device of the autonomous subject vehicle (such as its DCM) may transmit geolocation data (latitude/longitude and/or any other suitable type of geolocation information) to the remote server 806 while the ignition of the autonomous subject vehicle is on.

Returning to block 810, in response to the autonomous subject vehicle start-up command, at block 812 a GPS "pin" may be placed inside the transporter vehicle (i.e., a location is marked with a pin to denote the location of the transporter vehicle), although any suitable marker/indicator may be utilized. At block 814, autonomous subject vehicles residing outside of the transporter vehicle may be summoned one at a time (or any suitable configuration) to the location of the GPS pin. Based upon the summon command, at block 824 summoning instructions may be sent from the remote server 806 to the DCM (or other suitable input/out device) of an autonomous subject vehicle. At block 826, the autonomous subject vehicle may process the summoning request and enter the transporter vehicle (or exit if already located in the transporter vehicle).

Returning to block 814, in response to the summoning command, at block 816 the mobile device outputs an engine-shutdown command for the autonomous subject vehicles to remotely stop. In this embodiment, this command may be geo-filtered such that it is sent by the remote server 806 (for example) to autonomous subject vehicles within the transporter vehicle. At block 830, an autonomous subject vehicle may receive the engine stop request via its output device (such as a DCM). At block the autonomous subject vehicle may process the engine stop request. At block 834, the geolocation corresponding to the ignition being turned off may be uploaded via DCM or other output device of the autonomous subject vehicle to the remote server 806. The remote server 806 may set, read, update, or otherwise manage a flag/record within the logistics system 802 pertaining to whether an autonomous subject vehicle is within the transporter vehicle geofence 836.

Figure 9:
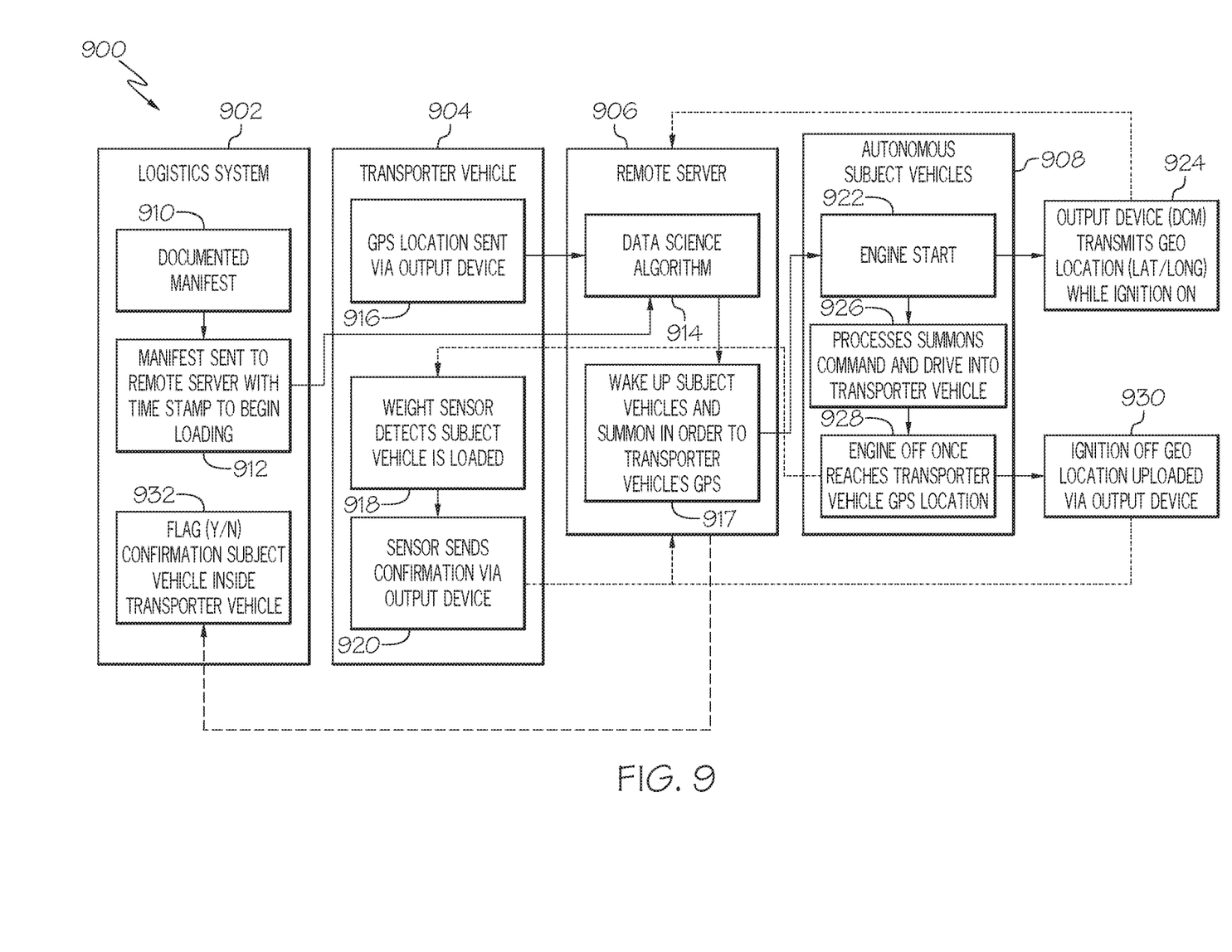
FIG. 9 is a block diagram illustrating an exemplary automated system for a transporter vehicle to summon and/or manage subject vehicles, according one or more embodiments shown and described herein.

Turning to FIG. 9, an automated system for a transporter vehicle to summon and/or manage subject vehicles 900 is depicted. In this embodiment, which may correspond to FIG. 3, a smart transporter vehicle 904 may summon an autonomous subject vehicle 908 to self-load/unload into/from the smart transporter vehicle 904. A logistics system 902 may include a documented manifest 910 of the arrivals/departures of autonomous subject vehicles 908 to/from a smart transporter vehicle 904. In this way, the inventory of autonomous subject vehicles 908 at any given time may be determined, along with changes in the transporter vehicle's inventory of autonomous subject vehicles 908 over time.

At block 912, the manifest may be sent to a remote server 906 and utilized as input for a data science algorithm 914. Additionally, at block 916 the GPS location (or other location data) of the smart transporter vehicle 904 may be sent via its output device (such as its DCM) to the remote server 906 and also utilized as input for a data science algorithm at 914. At the remote server 906, one or more data science algorithms 914 may be utilized for determining where a particular autonomous subject vehicle 908 should park in terms of level within the smart transporter vehicle 904 and/or a parking location. For example, any suitable type of data science algorithm may utilized to determine, for one or more autonomous subject vehicles, a closest level and/or parking location, a level/spot that is quickest to reach, a level/spot that is best suited based upon a received or predicted duration of the stay of the autonomous subject vehicle, and the like. In some embodiments, such as that corresponding to FIG. 1, data science algorithms may be utilized to provide navigational instructions to a driver of a subject vehicle. At block 917, the remote server 906 may start the engines 922 of autonomous subject vehicles 908 so that they may be summoned to the transporter vehicle GPS location in a particular order. In another embodiment, the order of entry for the autonomous subject vehicles 908 may be determined at other points in time, such as when already en route to the smart transporter vehicle 904 or upon arrival at the transporter vehicle GPS location.

Based upon the summoning at block 917, the engine (or other component(s)) of an autonomous subject vehicle 908 may start at block 922. Based upon the engine start at block 922, the DCM (or other output device of the autonomous subject vehicle 908 may transmit its geolocation data (latitude and longitude, or other location data) at block 924 while the ignition is on. The geolocation data may be transmitted continuously, periodically, randomly, or utilizing any other means. Additionally, based upon the engine start at block 922, the autonomous subject vehicle 908 may process the summon command and drive into the smart transporter vehicle at block 926. At block 928, the autonomous subject vehicle 908 may turn its engine off once it reaches the GPS location of the smart transporter vehicle 904. At block 930, the ignition of the autonomous subject vehicle 908 may be turned off and the geolocation data uploaded to the remote server 906 via, the DCM or other output device.

At block 918, weight sensors in the smart transporter vehicle 904 detect when autonomous subject vehicles 908 are loaded into the smart transporter vehicle 904. At block 920, the weight sensors send confirmation to the remote server 906 that autonomous subject vehicles 908 have been loaded. In some embodiments, the weight of each autonomous subject vehicle 908 is stored (in the remote system, logistics system, and the like) and compared to the weight sensor values to uniquely identify each autonomous subject vehicle 908 upon loading. In other embodiments, an expected weight range or minimum weight value detected may register the detection of a vehicle without unique identification. In some embodiments, cameras or other imaging devices may be employed for vehicle identification utilizing any suitable techniques, such as using optical character recognition (OCR) on a tag identifier visible on the vehicle. At block 932, the remote server 906 may provide data for a yes/no flag or other type of record/indicator for confirmation that an autonomous subject vehicle 908 is inside the smart transporter vehicle 904. In some embodiments, this may be used to update the documented manifest 910 in the logistics system 902.

Figure 10:
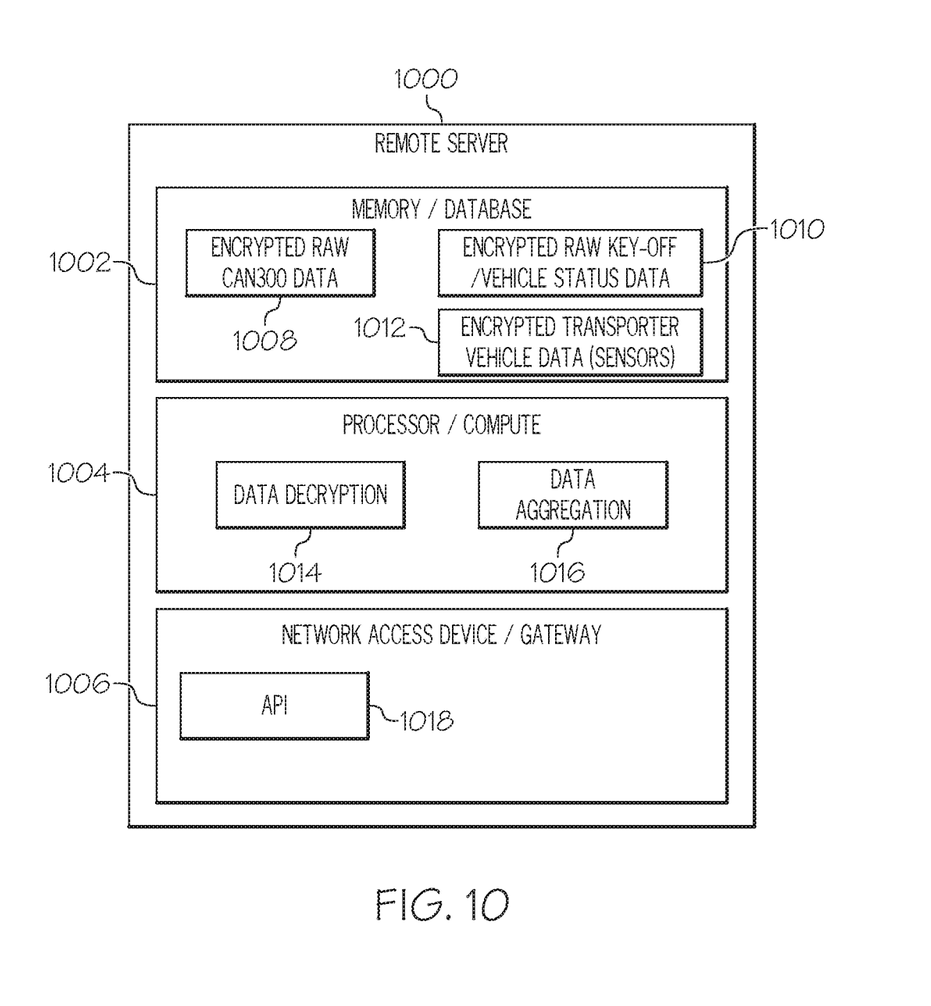
FIG. 10 is a block diagram illustrating a remote server utilized in one or more devices for implementing various systems and processes, according one or more embodiments shown and described herein.

Turning to FIG. 10, an embodiment of a remote server 1000 is depicted. The remote server 1000 may have a memory/database 1002 that utilizes/stores encrypted raw CAN300 data 1008, encrypted raw key-off/vehicle status data 1010, and encrypted transporter vehicle data obtained from sensors 1012 (such as the weight sensors depicted in FIG. 2 and FIG. 3). The remote server 1000 may also have a processor 1004 utilized in computations involving data decryption 1014 and data aggregation 1016. For example, the processor 1004 may be utilized in the decryption 1014 of the encrypted raw CAN300 data 1008, encrypted raw key-off/vehicle status data 1010, and encrypted transporter vehicle data obtained from sensors 1012. The remote server 1000 may also feature a network access device/gateway 1006 that utilizes an API 1018 in communication with other devices, such as the API 808 of the mobile client device 804 as depicted in FIG. 8.

Figure 11:
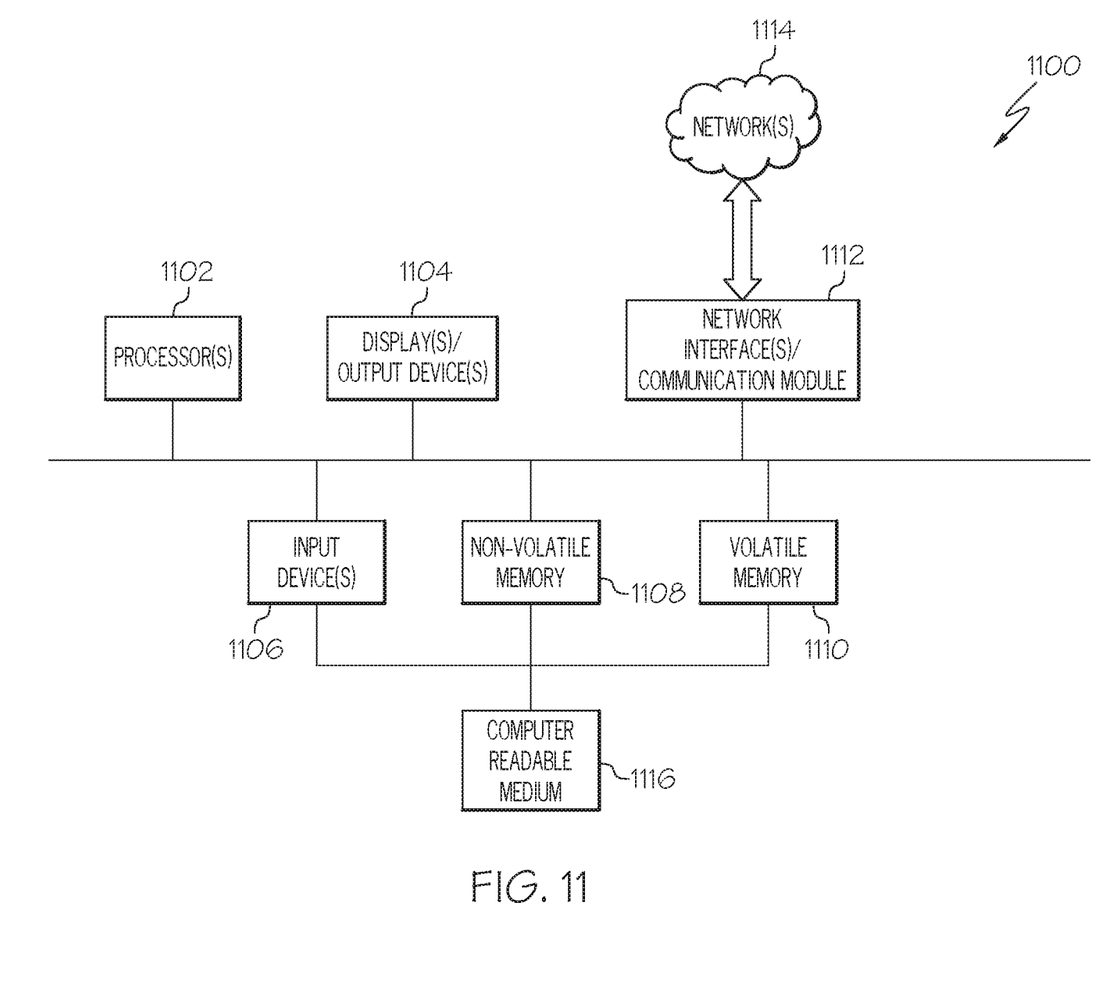
FIG. 11 is a block diagram illustrating computing hardware utilized in one or more devices for implementing various systems and processes, according one or more embodiments shown and described herein.

Turning to FIG. 11, a block diagram illustrates an exemplary computing environment 1100 through which embodiments of the disclosure can be implemented, such as, for example, in the transporter vehicles 102, 202, 302 and/or subject vehicles 104, 204, and/or 304 as depicted in FIGS. 1-3 and/or any subcomponents therein, along with any other computing device depicted in any of FIGS. 1-10. The computing environment 1100 includes at least one processor 1102 and memory (non-volatile memory 1108 and/or volatile memory 1110). The exemplary computing environment 1100 may include non-volatile memory 1108 (ROM, flash memory, etc.), volatile memory 1110 (RAM, etc.), or a combination thereof. In some embodiments, the at least one processor 1102 is coupled to the non-volatile memory 1108 and/or volatile memory 1110. The computing environment 1100 may utilize, by way of non-limiting example, RAM, ROM, cache, fiber optics, EPROM/Flash memory, CD/DVD/BD-ROM, hard disk drives, solid-state storage, optical or magnetic storage devices, diskettes, electrical connections having a wire, any system or device that is of a magnetic, optical, semiconductor, or electronic type, or any combination thereof.

The exemplary computing environment 1100 can include one or more displays and/or output devices 1104 such as monitors, speakers, headphones, projectors, wearable-displays, holographic displays, and/or printers, for example. The exemplary computing environment 1100 may further include one or more input devices 1106 which can include, by way of example, any type of mouse, keyboard, disk/media drive, memory stick/thumb-drive, memory card, pen, joystick, gamepad, touch-input device, biometric scanner, voice/auditory input device, motion-detector, camera, scale, etc.

A network interface 1112 can facilitate communications over one or more networks 1114 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LIE, WiMAX, UMTS, CDMA, and GSM. The exemplary computing environment 1100 may include one or more network interfaces 1112 to facilitate communication with one or more remote devices, which may include, for example, client and/or server devices. A network interface 1112 may also be described as a communications module, as these terms may be used interchangeably. Network interface 1112 can be communicatively coupled to any device capable of transmitting and/or receiving data via the one or more networks 1114, which may correspond to the cloud 110, 210, 310 depicted in FIGS. 1-3, by way of non-limiting example.

The network interface hardware 1112 can include a communication transceiver for sending and/or receiving any wired or wireless communication. For example, the network interface hardware 1112 may include an antenna, a modem, LAN port, Wi-Fi card, WiMax card, mobile communications hardware, near-field communication hardware, satellite communication hardware and/or any wired or wireless hardware for communicating with other networks and/or devices. In one example, the network interface hardware 1112 may correspond to the network access device 1006 depicted in FIG. 10.

A computer-readable medium 1116 may comprise a plurality of computer readable mediums, each of which may be either a computer readable storage medium or a computer readable signal medium. A computer readable medium 1116 may reside, for example, within an input device 1106, non-volatile memory 1108, volatile memory 1110, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media exclude propagated signals and carrier waves.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
receiving, by a processor, geolocation data from a subject vehicle;
determining, by the processor, a subject vehicle has entered a transporter vehicle based on location information of the subject vehicle in the geolocation data; and
determining, by the processor, a parking location within the transporter vehicle at which the subject vehicle is to park in response to determining the subject vehicle has entered the transporter vehicle,
wherein the subject vehicle receives a communication from the transporter vehicle regarding the parking location upon determining the subject vehicle has entered the transporter vehicle.

2. The method of claim 1, wherein each of a plurality of subject vehicles to be loaded onto or unloaded off of the transporter vehicle is assigned to the parking location on the transporter vehicle as part of a vehicle manifest.

3. The method of claim 1, wherein each of a plurality of subject vehicles are loaded in assigned parking locations on the transporter vehicle.

4. The method of claim 2, wherein:
the transporter vehicle summons the subject vehicle based on the parking location in the vehicle manifest.

5. The method of claim 1, wherein:
the transporter vehicle communicates with the subject vehicle regarding loading, unloading, or both; and
the subject vehicle is an autonomous vehicle that personnel summon, via a web app, onto the transporter vehicle to auto-park or to depart the transporter vehicle.

6. The method of claim 1, further comprising:
outputting a notification based upon the subject vehicle entering the transporter vehicle; and
determining the parking location within the transporter vehicle at which the subject vehicle is to park subsequent to entering the transporter vehicle.

7. The method of claim 1, wherein:
the subject vehicle is driven onto the transporter vehicle; and
the subject vehicle provides location data to a cloud-based geo-location tool.

8. The method of claim 1, wherein
the subject vehicle is periodically pinged for its location after entering the transporter vehicle.

9. The method of claim 1, further comprising:
determining upon which level the subject vehicle is to park; and
utilizing key-off data to determine where the vehicle has parked.

10. A system comprising:
a memory and a processor coupled to the memory;
a reporting module utilizing the processor, the reporting module configured to:
receive geolocation data from a subject vehicle; and
determine a subject vehicle has entered a transporter vehicle based on location information of the subject vehicle in the geolocation data; and
a coordination module configured to determine a parking location within the transporter vehicle at which the subject vehicle is to park in response to determining the subject vehicle has entered the transporter vehicle,
wherein the subject vehicle receives a communication regarding the parking location upon determining the subject vehicle has entered the transporter vehicle.

11. The system of claim 10, wherein:
the transporter vehicle communicates with a plurality of subject vehicles, wherein each of the plurality of subject vehicles to be loaded onto or unloaded off of the transporter vehicle is assigned to the parking location on the transporter vehicle as part of a vehicle manifest.

12. The system of claim 10, wherein:
the transporter vehicle communicates with a plurality of subject vehicles, wherein each of the plurality of subject vehicles are loaded in assigned parking locations on the transporter vehicle.

13. The system of claim 11, wherein:
the transporter communicates with the subject vehicle, wherein:
the transporter vehicle summons the subject vehicle based on the parking location in the vehicle manifest.

14. The system of claim 10, wherein:
the transporter vehicle communicates with the subject vehicle regarding loading, unloading, or both, wherein the subject vehicle is an autonomous vehicle that personnel summon, via a web app, onto the transporter vehicle to auto-park or to depart the transporter vehicle.

15. The system of claim 10, wherein the processor is further configured to:
output a notification based upon the subject vehicle entering the transporter vehicle; and
determine the parking location within the transporter vehicle at which the subject vehicle is to park subsequent to entering the transporter vehicle.

16. The system of claim 10, wherein:
the subject vehicle is configured to be driven onto the transporter vehicle; and
the subject vehicle is configured to provide location data to a cloud-based geo-location tool.

17. The system of claim 10, further comprising the subject vehicle,
wherein the subject vehicle is periodically pinged for its location after entering the transporter vehicle.

18. The system of claim 10, wherein the processor is further configured to:
determine upon which level the subject vehicle is to park; and
utilize key-off data to determine where the vehicle has parked.

19. The method of claim 1, wherein the geolocation data includes ignition-on location data indicative of a location of the subject vehicle at ignition-on, and whether the subject vehicle has entered the transporter vehicle is determined based on the ignition-on location data.

20. The method of claim 1, wherein the geolocation data includes key-off location data indicative of a location of the subject vehicle at key-off, and whether the subject vehicle has entered the transporter vehicle is determined based on the key-off location data.

21. The method of claim 1, further comprising:
comparing weight data of the subject vehicle to a weight sensor value from a weight sensor of the transporter vehicle to identify the subject vehicle has been loaded to the transporter vehicle.

22. The method of claim 1, further comprising:
confirming that the subject vehicle is inside the transporter vehicle based on image data including vehicle identification information received from a camera of the transporter vehicle.

* * * * *

UNITED STATES PATENT AND TRADEMARK OFFICE
CERTIFICATE OF CORRECTION

PATENT NO. : 11,639,168 B2
APPLICATION NO. : 16/698104
DATED : May 2, 2023
INVENTOR(S) : Tyler Brown and Valerie Impullitti Page 1 of 1

It is certified that error appears in the above-identified patent and that said Letters Patent is hereby corrected as shown below:

In the Specification

In Column 7, Line 14, delete "pot" and insert --spot--, therefor.

In Column 9, Line 43, after "block", insert --832,--.

Signed and Sealed this
Twenty-sixth Day of September, 2023

Katherine Kelly Vidal
*Director of the United States Patent and Trademark Office*